United States Patent [19]
Baugh

[11] Patent Number: 5,074,712
[45] Date of Patent: Dec. 24, 1991

[54] METHOD AND APPARATUS FOR REMOTE REPAIR OF SUBSEA PIPELINES

[76] Inventor: Benton F. Baugh, 14626 Oak Bend, Houston, Tex. 77079

[21] Appl. No.: 491,862

[22] Filed: Mar. 12, 1990

[51] Int. Cl.⁵ .............................................. F16L 1/26
[52] U.S. Cl. ................................. 405/158; 405/169; 405/188
[58] Field of Search ............... 405/158, 169, 170, 188, 405/190, 191; 138/97; 285/18, 373, 419, 920

[56] References Cited

U.S. PATENT DOCUMENTS

| | | | |
|---|---|---|---|
| 3,508,410 | 4/1970 | Lynch | 405/190 |
| 3,599,436 | 8/1971 | Lochridge | 405/169 |
| 4,019,334 | 4/1977 | Sinclair et al. | 405/169 |
| 4,078,832 | 3/1978 | Wittman | 285/18 |
| 4,441,328 | 4/1984 | Brister | 138/97 X |
| 4,465,310 | 8/1984 | Archer | 285/373 |
| 4,863,314 | 9/1989 | Baugh | 405/191 |

OTHER PUBLICATIONS

"Plidco Split–Sleeves", Oil & Gas Journal, Nov. 15, 1976.
"The Design and Economic Impact of Standardized Rov and Diver Interfaces on Subsea Completion Systems", OTC Paper 6044, Offshore Technology Conference, May 1989.
"Theory, History, and Results on Sealants for Subsea Service", OTC Paper 6393, Offshore Technology Conference, May 1990.

Primary Examiner—David H. Corbin

[57] ABSTRACT

A method and apparatus for repairing leaks in subsea pipelines which comprises two split clamp halves with redundant seal means which are installed around the subsea pipeline in a programmed fashion to allow low clearances below the pipeline.

22 Claims, 3 Drawing Sheets

METHOD AND APPARATUS FOR REMOTE REPAIR OF SUBSEA PIPELINES

FIELD OF THE INVENTION

The present invention relates to the area of equipment installed on subsea pipelines to make subsea repairs by remote control operations, particularly equipment requiring reduced clearances below the pipelines and with redundant seal means.

BACKGROUND OF THE INVENTION

Pipelines are being laid along the ocean floor in depths of water as deep as 3000 feet. The pipelines are subject to a variety of dangers including laying stresses, being laid across rock outcroppings, having to span valleys, and having equipment dropped on them. Any of these factors can cause a pipeline to leak. They may also leak due to manufacturing defects or errors in the connection processes at the surface.

When a pipeline begins to leak, it can cost an extremely high sum of money to try to bring it back to the surface. Cases have been known when an operator attempted to bring a shallow water pipeline to the surface for a repair, and caused several other leaks in doing so.

More typically in shallow water, divers are sent down with split clamp assemblies to clamp around the pipe, seal on the pipe, and act as a repair device. An excellent discussion of this was included in the November 1976 issue of the Oil & Gas Journal Magazine.

The ability to repair the pipeline is critical. If the leak cannot be stopped, the pipeline must be abandoned.

The ability to remotely repair a pipeline is needed to safely repair pipelines in diver depths of seawater, however, beyond approximately 1000 feet of water, the divers cannot make repairs at all. Beyond this depth, without the ability to make remote repairs, the expensive pipelines must simply be abandoned. The cost of a replacement pipeline in 1000-3000 feet of water is millions of dollars, and millions of dollars in deferred production.

SUMMARY OF THE INVENTION

The object of the present invention is to provide a device which can be used by remotely operated vehicles and make repairs on subsea pipelines in any depth of water, especially in depths of water beyond diver depths.

A second object of the present invention is to provide a device which can be installed on a subsea pipeline with only limited clearance below the pipeline.

A third object of the present invention is to provide a device which provides a remotely operable primary seal around the pipeline.

Another object of the present invention is to provide a device which provides a secondary remotely operable seal around the pipeline.

Another object of the present invention is to provide the ability to test between the primary and secondary seals.

Another object of the present invention is to provide the ability to inject sealant between the primary and secondary seals and repair leaks in the primary and/or secondary seals.

DESCRIPTION OF THE PREFERRED EMBODIMENT

Figure 1:
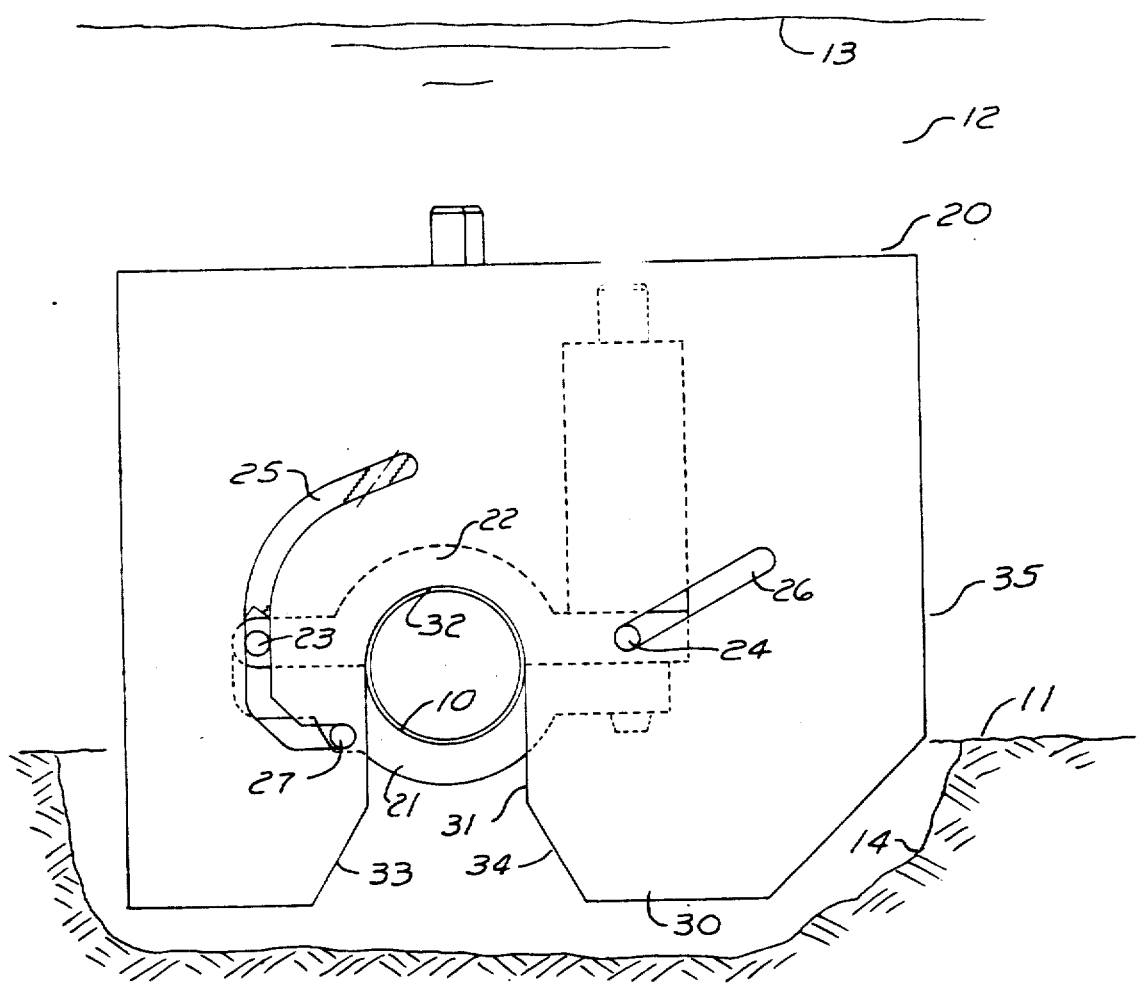
FIG. 1 is a view of the device of this invention as seen from along the pipeline upon which it is sealing. The device is in the fully closed and sealing position.

Referring now to FIG. 1, pipeline 10 is shown laid along the sea floor 11 is the ocean 12 and below the surface 13 of the ocean 12. For the purpose of this invention, it is assumed that the owner of the pipeline has determined the location of a leak in the pipeline. It is necessary that the axial location of the leak be determined, but not the radial orientation of the leak. At the location of the leak, a small recess 14 is dug below the pipeline of sufficient depth to allow the installation of the clamp means of this invention. In some cases where the pipeline has been buried, this recess may be required to be relatively large. In some cases where the pipeline is bridging a valley, no recess may be required at all.

Clamp assembly 20 is specially prepared to repair leaks in pipeline 10 by remote operations such as by remotely operated vehicles called ROVs. The ROVs can provide transportation to the job site, TV visibility, sonar capability, hydraulic power, and limited manipulator power.

Clamp assembly 20 includes lower clamp half 21 and upper clamp half 22 which wrap around the pipeline and seal against the pipeline. Each clamp half is intended to seal half of the distance around the pipe in a semicircular form. On the upper clamp half 22, guide pins 23 and 24 cooperate with program slots 25 and 26 repsectively to direct the movement of upper clamp half 22 during opening and closing operations. During opening operations, upper clamp half 22 generally moves up and to the right. During closing operations it generally moves down and to the left.

Guide pins 23 and 27 cooperate with program slot 25 to direct the movement of lower clamp half 21 during opening and closing operations. During opening operations, the lower clamp half 21 generally moves in a clockwise direction around the pipe. How these movements are accomplished will be more readily seen in the following figures.

End plate 30 provides a slot 31 with a curved top 32 which acts as a saddle to allow the clamp assembly 20 to be landed on the pipeline 10. Chambers 33 and 34 allow for easy guidance of the clamp assembly 20 onto the pipeline 10.

End plate 30 and other structural members generally combine to form a housing 35 which is the main structural member of the clamp assembly 20.

Figure 2:
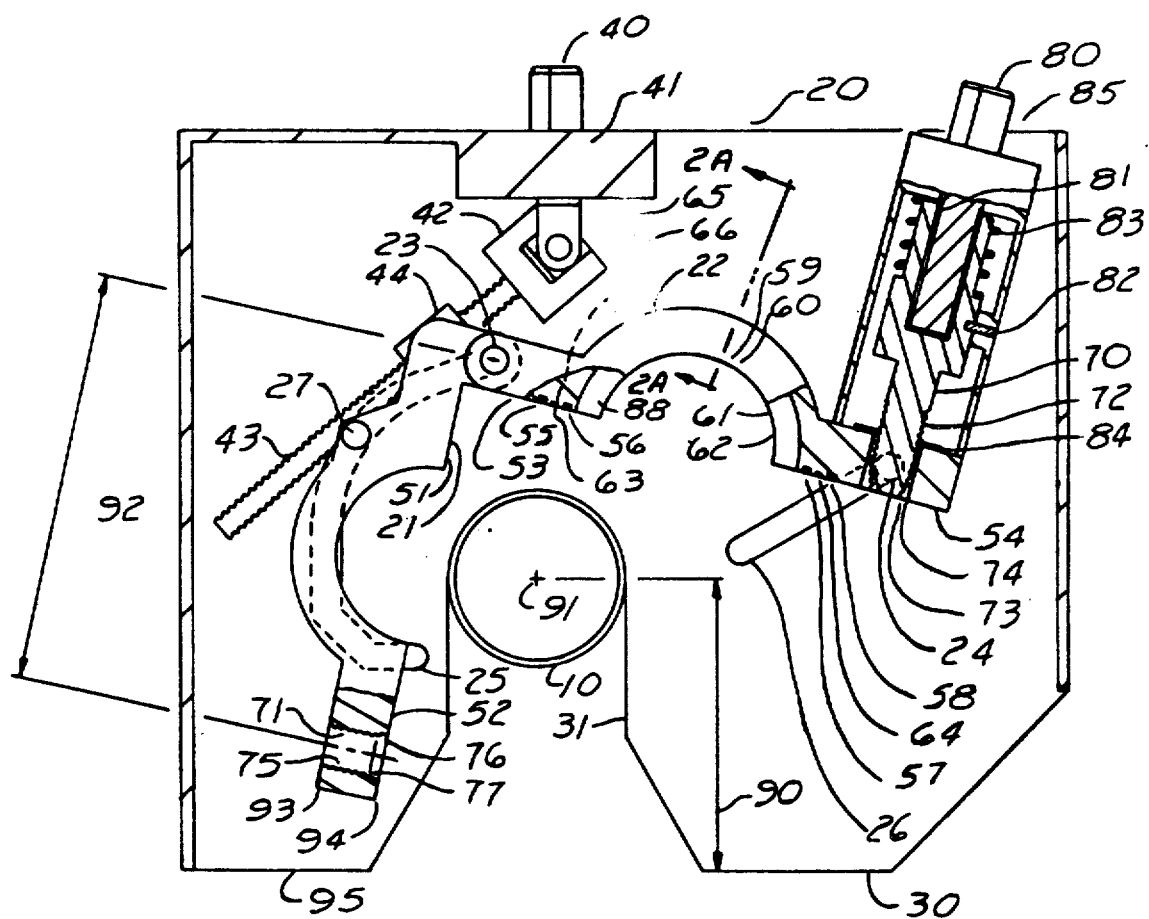
FIG. 2 is a partial cross section view from the same direction as in FIG. 1. In this view the various parts of the device of this invention are in the open position for landing onto the pipeline.

Referring now to FIG. 2, a clamp assembly 20 is shown in partial cross section and in the opened position. This opened position allows the clamp assembly 20 to be easily installed onto the pipeline or removed from the pipeline in the vertical direction. As can be seen guide pins 23 and 24 have moved along program slots 25 and 26 to direct the upper clamp half 22 upward and to the right. Guide pins 23 and 27 have moved along program slot 25 to bring the lower clamp half 21 out from under the pipeline 10 and to a clockwise, elevated position.

As can be clearly noted, clamp assembly 20 can now be simply lifted off of or installed onto the pipeline 10.

Square stem 40 is mounted in block 41 and can be rotated by means to be discussed later. As square stem 40 rotates, it rotates U-joint 42 and threaded stem 43. Rotation of threaded stem 43 causes collar 44 to move axially along the threaded stem 43. Collar 44 is attached to lower clamp half 21, and is therefore connected to upper clamp half 21 thru guide pin 23. As square stem 40 is moved in a clockwise direction, collar 44 moves downwardly along threaded stem 43 and pushes lower clamp 21 and upper clamp 22 from the position as shown on FIG. 2 to the position as shown on FIG. 1. The rotation of the single square shaft 40 causes the upper and lower clamp halves to move from the opened to the closed positions. This movement can be generated by other means, such as by a hydraulic cylinder.

As faces 51 and 52 of lower clamp half 21 contact faces 53 and 54 of upper clamp half 22, seal portions 55, 56, 57, and 58 on upper clamp half sealingly engage seal portions on lower clamp half 21. Seal portions 56 and 57 are parts of the same seal with seal portion 59 and 60 following the contour 61 and 62 of each end of the upper clamp half 22. In like manner seal portions 55 and 58 are parts of the same seal with seal portions like 59 and 60 following the contour 61 and 62 of each end of the upper clamp half 22. In this manner seal portions 56, 59, 57, and 60 are a single seal which seal axially, circumferentially, axially, and then circumferentially to make a continuous seal, and are opposed by an similar type seal on the lower clamp half 21. This dual set of seals which seal the interface between the clamp halves and onto diameter of pipeline provide two independent seals between the leak in the pipeline and the environment.

Figure 2A:
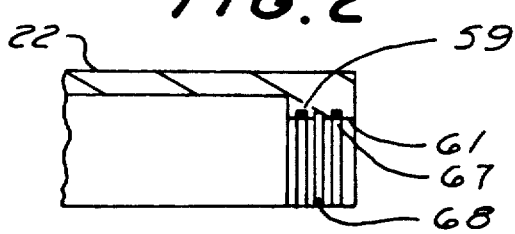
FIG. 2A is a partial cross section taken thru FIG. 2 which shows the seals which seal around the circumference of the pipe.

Referring now to FIG. 2A, seal portion 59 is shown in a position to seal around the pipeline. Seal portion 60 is of identical construction on the opposite end of upper clamp half 22. Seal portion 67 is a seal portion like 59, but connects seal portions 55 and 58. Groove 68 connects grooves 63 and 64 to communicate test pressure around the assembly.

Referring again to FIG. 2, in like manner grooves 63 and 64 are connected to provide a continuous flow path between the seals. This flow path can be communicated with thru hydraulic porting 65 for the purpose of testing the seals after installation. Pressuring this flow path thru a check valve 66 will provide assurance that both seals are holding pressure and preventing leaks against the environment. Further, if a leak is detected in one of these seals for any reason, the same flow path can be used to pump a sealant material between the seals to cause a seal to be achieved. Sealants to handle this task can be of a relatively viscous nature, or may require solid materials such as small pieces of teflon to achieve a pressure tight seal. The nature of these sealants is well known in the art. More information on sealants can be found in paper no. 6393 titled "Theory, History, and Results on Sealants for Subsea Service" which was presented at the 1990 Offshore Technology conference.

Once the square stem 40 has been rotated to bring the clamp halves together, additional clamping force is required in all but the simplest applications. For this purpose bolt 70 is positioned adjacent to female thread 71. Bolt 70 is specially prepared with a straight thread portion 72 and a tapered thread portion 73 which aligns with the straight portion 72 at point 74.

Female thread 71 has a straight portion 75 and a tapered thread portion 76 which aligns with the straight portion 75 at point 77. The purpose of this thread design is to allow the remote connection of the threads without the possibility of damaging the lead thread or cross threading the threads.

When the upper clamp half 22 and the lower clamp half 21 are properly aligned as shown in FIG. 1, square stem 80 is rotated to the right. When the square stem 80 is rotated to the right, spline 81 causes the bolt 70 to rotate also, shearing the shear pin 82. When shear pin 82 shears, spring 83 pushes the bolt 70 down until the tapered thread portions 73 and 76 begin to engage. Further rotation causes the bolt 70 to be fully made up into the female thread 71. Bearing ring 84 is provided to assist in keeping the torque requirements low.

The bolt assemblies as generally noted as 85 are repeated as required to provide the necessary force to withstand internal pressure loadings of the clamp. These stud assemblies can be individually powered by hydraulic motors or the like when desired.

In some cases the pipeline to be repaired will have a coating such as concrete which must be removed to allow the clamp to be installed. Whereas a clamp assembly may be 3 or 4 feet long or longer, the length required for sealing may be only 5 or 6 inches at each end. It would be preferred to work to remove the concrete coatings for only the required 5 or 6 inches at each end. For this reason, an enlarged bore 88 is provided intermediate the ends which is larger than the outer diameter of concrete coatings.

The end plate 30 of the clamp assembly can be seen to extend a distance 90 down below the centerline of the pipeline 91. The distance 92 between the center of the guide pin 23 which connects the two clamp halves together and the centerline of the female thread 71 which connects the opposite sides of the two clamp halves together is shown to be considerably larger than the distance 90. The movement of corners 93 and 94, and all other parts of the lower clamp half 21 are guided to remain above the bottom 95 of the end plate 30. Alternately, if the upper clamp half was merely landed on the pipeline and the lower clamp half hinged around into position, a considerably greater clearance would be required for operation. Such clearances are difficult for remotely operated vehicles (ROVs) to make and to maintain.

Figure 3:
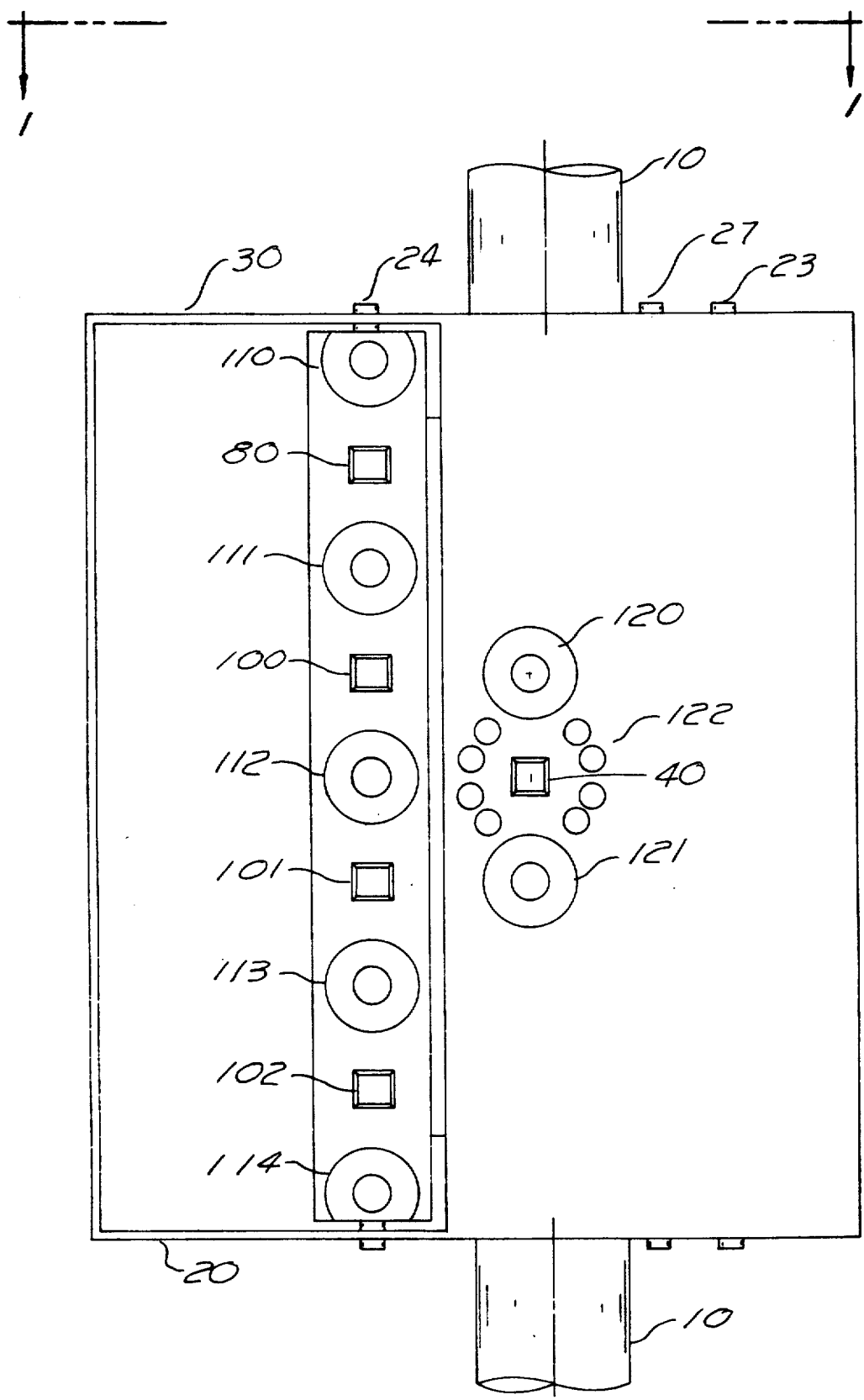
FIG. 3 is a top view of the device of FIG. 1 in the fully closed and sealing position.

Referring now to FIG. 3, a top view of the clamp asembly 20 is seen over the pipeline 10. Square stem 80 is shown with other square stems 100, 101, and 102. This means that in this case four bolt assemblies as shown as 85 in FIG. 2 are used to snugly bolt the clamp halves together. Docking funnels 110, 111, 112, 113, and 114 are provided on each side of the square stems to allow landing a torque wrench over the square stems and to take torque backup during the torquing operations. Wrenches to do this task are discussed in the 1989 Offshore Technology Conference Technical Paper No. 6044 titled "The Design and Economic Impact of Standardized ROV and Diver Interfaces on Subsea Completion Systems".

In this case an ROV would use a single wrench and move along the line of square stems and tighten them individually.

In like manner, square stem 40 is provied with docking funnels 120 and 121 for docking and torque backup when rotating the square stem 40.

Additonally eight hydraulic ports 122 are provided which can do other needed functions. A first function for these ports is that of actually attaching the ROV tools to the clamp assembly 20 to pick it up and transport it to the job site. One or more of these ports can be used for this function as is disclosed generally in figure no. 3 of U.S. Pat. No. 4,863,314.

The hydraulic ports can provide the path to pressure test the seals thru line 65, inject sealant into the area between the seals, or to operate hydraulic motors to replace the torque functions as described.

The foregoing disclosure and description of this invention are illustrative and explanatory thereof, and various changes in the size, shape, and materials, as well as the details of the illustrated construction may be made without departing from the spirit of the invention.

I claim:

1. A clamp type pipe repair assembly for repairing a subsea pipeline comprising a housing, a lower clamp half, an upper clamp half, means to support and control the movement of said clamp halves, means to connect said clamp halves, and means to seal between said clamp halves and around said pipeline, said upper and said lower clamping halves being of a generally semicircular configuration, said upper and said lower clamp halves having connecting means on each side generally adjacent to the ends of said semicircular portions, said housing configured to land on and be supported by said pipeline, said housing providing means to support said lower and upper clamp halves in a first open position for lowering to the pipeline, in a second closed position for sealing around said pipeline, and during the movement between said first and said second closed positions, said connecting means generally adjacent to said ends of said semicircular portions being a first distance apart, wherein said upper and lower clamp halves move from said first open to said second closed positions without moving more than said first distance below the centerline of said pipeline, said upper and lower clamp halves extend a second distance along said pipeline from a first axial end to a second axial end, wherein primary seals means are provided along the adjacent ends of said upper and lower clamp halves on a first side, around said pipeline adjacent to said first axial end, along the adjacent ends of the upper and lower clamp halves on a second side, and around said pipeline adjacent to said second axial end, to provide a complete seal between said upper and lower clamp halves and said pipeline.

secondary seals are provided along the adjacent ends of said upper and lower clamp halves on a first side, around said upper and lower clamp halves on a first side, around said pipeline adjacent to said first axial end, along the adjacent ends of the upper and lower clamp halves on a second side, and around said pipeline adjacent to said second axial end, to provide a complete secondary seal between said upper and lower clamp halves and said pipeline.

said secondary seals completely surrounding and being outside the area sealed by said primary seal, a test port connection is provided for access into the area between said primary seal and said secondary seal for the purpose of pressuring and confirming the sealing ability of said primary and secondary seals, a check valve is installed in said test port connection such that when the sealing ability of said primary seal and said secondary seal are confirmed, said check valve can close and allow said secondary seal to act as a backup seal to said primary seal, said housing provided means to support said lower and upper clamp halves in a first open position for lowering to the pipeline, in a second closed position for sealing around said pipeline, and during said movement between said first open and said second closed positions are slots in first and second plates within said housing which are configured to direct the desired movement, said movement is caused by the movement of a threaded collar attached to said clamping halves along a rotated threaded stem attached to said housing, said housing provided means comprising two program slots to direct said desired movement of said upper and said lower clamp halves, said upper clamp half being guided by a guide pin engaged into each of the two said program slots for its movement, and said lower clamp half being guided by two guide pins engaged into one of said guide slots to direct its movement.

2. A clamp type pipe repair assembly for repairing a subsea pipeline comprising a housing, a lower clamp half, an upper clamp half, means to support and control the movement of said clamp halves, means to connect said clamp halves, and means to seal between said clamp halves and around said pipeline, said upper and said lower clamping halves being of a generally semicircular configuration, said upper and said lower clamp halves having connecting means on each side generally adjacent to the ends of said semicircular portions, said connecting means generally adjacent to said ends of said semicircular portions being a first distance apart, said housing configured to land on and be supported by said pipeline, said housing providing means to support said lower and upper clamp halves in a first open position for lowering to the pipeline, in a second closed position for sealing around said pipeline, and during the movement between said first open and said second closed positions, said upper and lower clamp halves moving from said first open to said second closed positions without moving more than said first distance below the centerline of said pipeline.

3. The invention of claim 2, wherein said connecting means adjacent to one end of said ends of said semicircular portions is a hinge.

4. The invention of claim 3, wherein said connecting means adjacent to the other of the ends of said semicircular portions is a plurality of bolts on the upper clamp half which engage threaded portions on said lower clamp half.

5. The invention of claim 4, wherein said bolts are of a straight thread type which contain a tapered thread portion near the end.

6. The invention of claim 4, wherein said threaded portions on said lower clamp half are of a straight threaded type which contain a tapered thread portion near the end.

7. The invention of claim 4, wherein said bolts are held in a protected position until the lower clamp half is adjacent to the upper clamp half, and then is released to be spring loaded into initial thread contact.

8. The invention of claim 7, wherein means for holding said bolts in a protected position include a shear pin.

9. The invention of claim 7, wherein a spline is included between torque input means and said spring loaded bolt means to allow said torque input means remain axially stationary while said spring loaded bolt means travels axially to effect threaded engagement.

10. A clamp type pipe repair assembly for reparing a subsea pipeline comprising a housing, a lower clamp half, an upper clamp half, means to support and control the movement of said clamp halves, means to connect said clamp halves, and means to seal between said clamp halves and around said pipeline, said upper and said lower clamping halves being of a generally semicircular configuration, said upper and said lower clamp halves having connecting means on each side generally adjacent to the ends of said semicircular portions, said housing configured to land on and be supported by said pipeline, said housing providing means to support said lower and upper clamp halves in a first open position for lowering to the pipeline, in a second closed position for sealing around said pipeline, and during the movement between said first open and said second closed positions.

11. The invention of claim 10, wherein said connecting means generally adjacent to said ends of said semicircular portions being a first distance apart, and wherein said upper and lower clamp halves move from said first open to said second closed positions without moving more than said first distance below the centerline of said pipeline.

12. The invention of claim 11, wherein said upper and lower clamp halves extend a second distance along said pipeline from a first axial end to a second axial end, and wherein primary seals means are provided along the adjacent ends of said upper and lower clamp halves on a first side, around said pipeline adjacent to said first axial end, along the adjacent ends of the upper and lower clamp halves on a second side, and around said pipeline adjacent to said second axial end, to provide a complete seal between said upper and lower clamp halves and said pipeline.

13. The invention of claim 12, wherein secondary seals are provided along the adjacent ends of said upper and lower clamp halves on a first side, around said pipeline adjacent to said first axial end, along the adjacent ends of the upper and lower clamp halves on a second side, and around said pipeline adjacent to said second axial end, to provide a complete secondary seal between said upper and lower clamp halves and said pipeline, said secondary seals completely surrounding and being outside the area sealed by said primary seal.

14. The invention of claim 13, wherein a test port connection is provided for access into the area between said primary seal and said secondary seal for the purpose of pressuring and confirming the sealing ability of said primary and secondary seals.

15. The invention of claim 14, wherein a check valve is installed in said test port connection such that when the sealing ability of said primary seal and said secondary seal are confirmed, said check valve can close and allow said secondary seal to act as a backup seal to said primary seal.

16. The invention of claim 15, further including the method of repairing said primary and/or said secondary seal wherein sealant materials are pumped thru said test port to seal over any leaks in said primary or secondary seals.

17. The invention of claim 10, wherein said housing provided means to support said lower and upper clamp halves in a first open position for lowering to the pipeline, in a second closed position for sealing around said pipeline, and during said movement between said first open and said second closed positions are slots in first and second plates within said housing which are configured to direct the desired movement.

18. The invention of claim 17, wherein said movement is caused by pressuring a hydraulic cylinder.

19. The invention of claim 17, wherein said movement is caused by the movement of a threaded collar attached to said clamping halves along a rotated threaded stem attached to said housing.

20. The invention of claim 17, wherein two program slots are provided to direct said desired movement of said upper and said lower clamp halves.

21. The invention of claim 20 wherein said upper clamp half is guided by a guide pin engaged into each of the two said program slots for directing its movement.

22. The invention of claim 20 wherein said lower clamp half is guided by two guide pins engaged into one of said guide slots to direct its movement.

* * * * *